(12) United States Patent
Middlemiss

(10) Patent No.: US 6,846,341 B2
(45) Date of Patent: Jan. 25, 2005

(54) METHOD OF FORMING CUTTING ELEMENTS

(75) Inventor: Stewart Middlemiss, Salt Lake City, UT (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 10/374,373

(22) Filed: Feb. 25, 2003

(65) Prior Publication Data

US 2003/0196385 A1 Oct. 23, 2003

Related U.S. Application Data

(60) Provisional application No. 60/359,630, filed on Feb. 26, 2002.

(51) Int. Cl.⁷ .......................... B24D 3/00; B24D 17/00; B24D 18/00
(52) U.S. Cl. .............................. 51/307; 51/309; 51/293
(58) Field of Search ........................ 51/307, 309, 293; 451/540, 544, 541, 48; 428/408

(56) References Cited

U.S. PATENT DOCUMENTS

| 3,141,855 A | | 7/1964 | Wentdorf, Jr. | |
| 4,268,276 A | | 5/1981 | Bovenkerk | |
| 4,907,377 A | | 3/1990 | Csillag et al. | |
| 5,807,432 A | * | 9/1998 | Hirabayashi | ................. 117/87 |
| 5,981,057 A | * | 11/1999 | Collins | ........................ 428/334 |

FOREIGN PATENT DOCUMENTS

EP          0 392 467 A    10/1990

OTHER PUBLICATIONS

Database Compendex Online; "Advancing the art of PCD tool grinding"; Manufacturing Engineering, vol. 104, No. 2, 2–1990, pp. 41–42; Engineering Information, Inc., New York, NY.

R. H. Wentorf, Jr. and H.P. Bovenkerk, "Preparation of Semiconducting Diamonds," *The Journal of Chemical Physics*, vol. 36, No. 8, Apr. 13, 1962, pp. 1987–1990.

R.H. Wentorf, Jr., "Diamond Formation at High Pressures," *Advances in High Pressure Research*, 1974, (selected pages) (pp. 249–281) Academic Press (no month).

J.E. Field, "Properties of Diamonds," 1979, selected pages (pp. 20–21, 90–91, 100–101, 642–643, and 652–653), Academic Press (no month).

* cited by examiner

*Primary Examiner*—Michael Marcheschi
(74) *Attorney, Agent, or Firm*—Christie, Parker & Hale, LLP

(57) ABSTRACT

An ultra-hard semiconductive polycrystalline diamond (PCD) material formed with semiconductive diamond particles doped with Li, Be or Al and/or insulative diamond particles having semiconductive surfaces, tools incorporating the same, and methods for forming the same, are provided. The ultra-hard PCD material may be formed using a layer of insulative diamond grit feedstock that includes additives therein, then sintering to convert a plurality of the diamond crystals to include a semiconductive surface. In another embodiment, the ultra-hard PCD material is formed by sintering semiconductive diamond grit feedstock consisting of diamond crystals doped with Li, Al or Be. The ultra-hard semiconductive PCD cutting layer exhibits increased cuttability, especially in EDM and EDG cutting operations.

18 Claims, 5 Drawing Sheets

FIG.3 ELECTRICAL RESISTANCE OF B DOPED PCD —AFTER HPHT PRESSING

METHOD OF FORMING CUTTING ELEMENTS

CROSS-REFERENCE TO RELATED APPLICATION

This application is based upon and claims priority of U.S. Provisional Patent Application No. 60/359,630, entitled Polycrystalline Diamond Having Type II Diamond Crystals and Method of Forming the Same, filed Feb. 26, 2002, the contents of which are herein incorporated by reference.

BACKGROUND OF THE INVENTION

This invention relates to polycrystalline diamond and more specifically to semiconductive polycrystalline diamond that exhibits enhanced cuttability, especially Electro-Discharge Machining or Electro-Discharge Grinding cuttability.

Polycrystalline diamond (PCD) materials known in the art are typically formed from diamond grains or crystals and a ductile metal catalyst/binder, and are synthesized by high temperature/high pressure ("HTHP") processes. Such PCD materials are ultra hard materials well known for their mechanical property of high wear resistance, making them a popular material choice for use in such industrial applications as cutting tools for machining, and subterranean mining and drilling, where the mechanical property of wear resistance is highly desired. In such applications, conventional PCD materials can be provided in the form of a surface coating, e.g., on inserts used with cutting and drilling tools, to improve wear resistance of the insert. Traditionally, PCD inserts used in such applications are produced by forming one or more layers of PCD-based material over a suitable substrate material. Such inserts, also referred to as cutting elements, comprise a substrate, a PCD surface layer, and optionally one or more transition layers to improve the bonding between the exposed PCD surface layer and the underlying substrate support layer. Substrates used in such insert applications are commonly formed from a carbide material such as tungsten carbide, WC, cemented with cobalt, Co, and commonly referred to as a cemented tungsten carbide, WC/Co system.

The layer or layers of PCD conventionally may include a metal binder therein. The metal binder is used to facilitate intercrystalline bonding between diamond grains, and acts to bond the layers to each other and to the underlying substrate. The metal binder material is generally included at a weight percentage of about 10% by weight. Metals conventionally employed as the binder are often selected from the group including cobalt, iron, or nickel and/or mixtures or alloys thereof. The binder material may also include metals such as manganese, tantalum, chromium and/or mixtures or alloys thereof. The metal binder may be provided in powder form as an ingredient for forming the PCD material, or can be drawn into the PCD material from the substrate material during HTHP process also referred to as the "sintering" process.

The amount of binder material that is used to form PCD materials represents a compromise between the desired material properties of toughness and hardness/wear resistance. While a higher metal binder content typically increases the toughness of the resulting PCD material, higher metal content also decreases the PCD material hardness, wear resistance and thermal stability. Thus, these inversely affected desired properties ultimately limit the flexibility of being able to provide PCD coatings having desired levels of both wear resistance and toughness to meet the service demands of particular applications. Additionally, when the PCD composition is chosen to increase the wear resistance of the PCD material, typically brittleness also increases, thereby reducing the toughness of the PCD material.

In many instances, after the PCD is formed, it must be cut to desired shapes for use in a cutting tool. Cutting is typically accomplished using Electro-Discharge Machining (EDM) or Electro-Discharge Grinding (EDG) operations which are well known in the art. However, because of the insulating nature of the diamond skeleton in conventional PCD it is essential to have a metallic matrix material present at the cut to ensure some conductivity of the PCD, essential to the aforementioned cutting operations. The metal binder in the PCD forms a metallic matrix and provides conductivity that supports EDM or EDG cutting. However, cooling fluid or dielectric fluid used for cooling during EDM or EDG cutting, may leach out the metal matrix from the PCD and significantly increase the resistance of the PCD layer. Various cooling/dielectric solutions such as Adcool™, and other corrosion inhibiting solutions and/or deionized water may be used during the EDM or EDG process. The electrical arcing produced between the cutting surface and the wire in EDM operations, and the grinding wheel in EDG operations, also causes leaching.

If the resistance of the PCD increases significantly due to the metal matrix in the PCD leaching out, or if areas with relatively little metal matrix are encountered, very slow or zero cutting rates may result and breakage of the cutting wire incorporated in the EDM process may occur. In some instances extra metal is provided in the PCD material to overcome this problem. Adding additional metal results in lower thermal stability of the PCD as well as reduced material hardness and a correspondingly reduced wear resistance.

Thus, a PCD material is desired that has enhanced EDM and EDG cuttability without a reduction in material hardness, wear resistance and thermal stability.

SUMMARY OF THE INVENTION

The present invention is directed to a polycrystalline diamond (PCD) ultra hard material and a method for forming the same. In one embodiment, the polycrystalline diamond ultra hard material includes semiconductive diamond crystals therein. The semiconductive diamond crystals may be diamond crystals doped with lithium, beryllium or aluminum. In another exemplary embodiment, the polycrystalline diamond ultra hard material is formed of conventional diamond crystals, at least some of which include semiconductive outer surface layers. According to either of the aforementioned exemplary embodiments, the polycrystalline diamond ultra hard material is a semiconductor material.

According to one exemplary method of the present invention, a cutting element is formed by providing a substrate and forming a polycrystalline diamond layer over the substrate. The polycrystalline diamond layer is formed over the substrate by providing a layer of diamond powder comprising non-conductive diamond grit feedstock and an additive, and converting the layer of diamond powder to polycrystalline diamond that is a solid semiconductor material. The additive may be chosen from the group consisting of lithium, beryllium, boron, and aluminum. Diamond grit feedstock composed of conventional, insulative diamond crystals, for example Type I diamond crystals, may be used.

According to another exemplary method of the present invention, a cutting element is formed by providing a layer of diamond grit feedstock including diamond crystals doped with at least one of beryllium, lithium and aluminum, then sintering to convert the layer of diamond grit feedstock to a semiconductive, solid polycrystalline diamond layer.

According to either of the exemplary methods of formation, the ultra hard PCD layer is formed as a semiconductor material with increased conductivity compared to PCD layers formed of conventional insulative diamond crystals, such as Type I diamond crystals. Even if all the metal binder materials that may be included in the PCD layer are removed by leaching, the cuttability of the semiconductive PCD material of the present invention is enhanced, especially EDM and EDG cuttability.

BRIEF DESCRIPTION OF THE DRAWINGS

The invention is best understood from the following detailed description when read in conjunction with the accompanying drawings. It is emphasized that, according to common practice, the various features of the drawing are not to scale. On the contrary, the dimensions of the various features may be arbitrarily expanded or reduced for clarity. Like numerals denote like features throughout the specification and drawings. Included are the following figures.

DETAILED DESCRIPTION OF THE INVENTION

Figure 1:
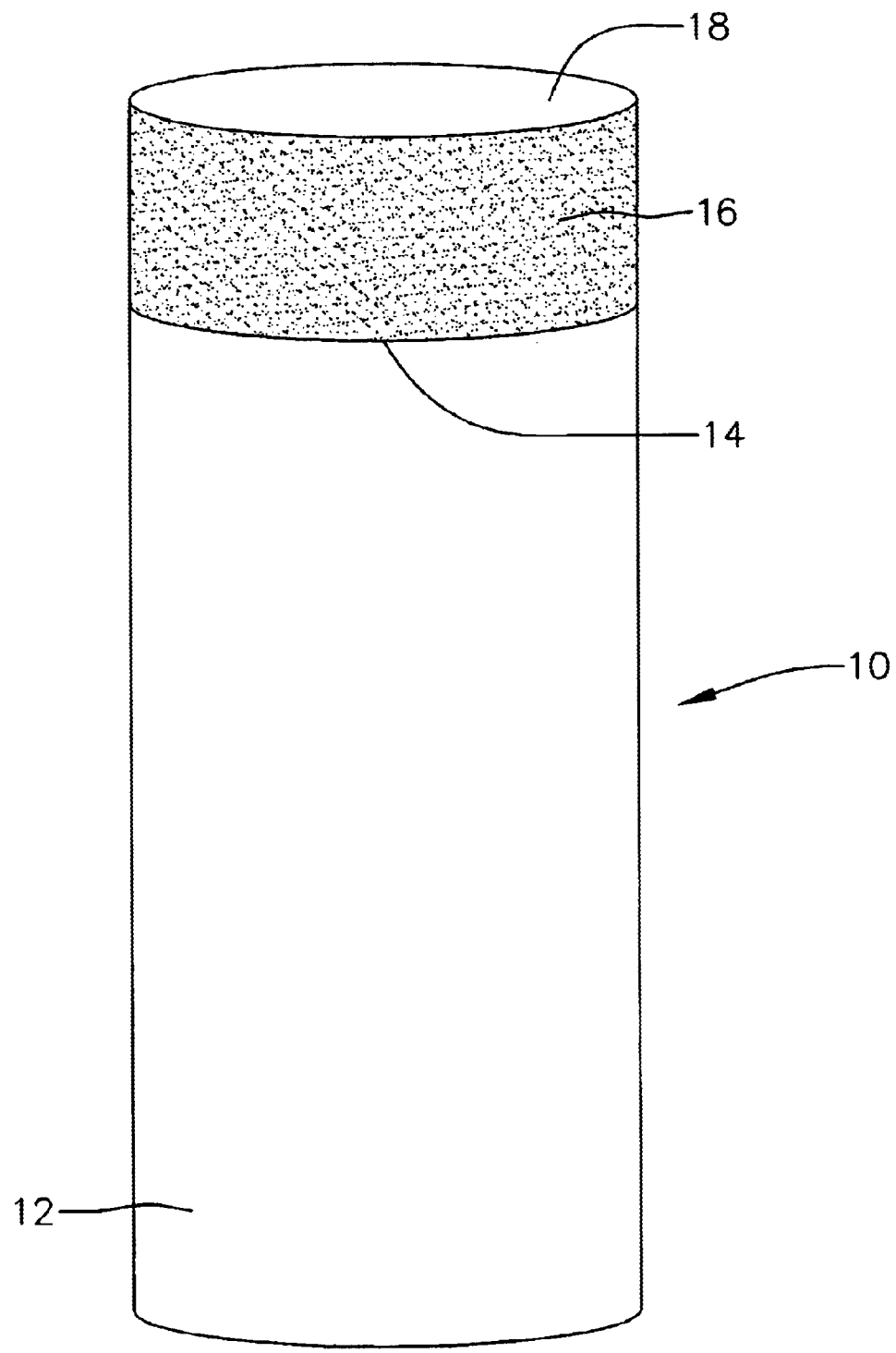
FIG. 1 is a perspective view of a cutting element according to an exemplary embodiment of the present invention.

A PCD material having enhanced cuttability, especially EDM and EDG cuttability without comprising its hardness, wear resistance, or thermal stability, cutting and other tools incorporating such material, and a method of making such material and tools, are provided. An exemplary embodiment PCD material of the present invention has a substantial percentage of diamond crystals that are semiconductive in nature or which include semiconductive outer surface layers. Such diamond crystals contain small quantities of interstitial impurities such as lithium (Li), beryllium (Be), boron (B), and aluminum (Al) that are sufficient to make them semiconductors.

Semiconductive diamonds are discussed in Wentorf, R. H. and Bovenkirk, H. P., "Preparation of Semiconducting Diamonds," J. Chem. Phys. 36, p. 1987 (1962); Field, J. E., "Properties of Diamond," Academic Press, 1979; and, Wentorf, R. H., "Diamond Formation at High Pressures", in Advances in High Pressure Research, Academic Press, p.249–281 (1974), the contents of each of which are hereby incorporated by reference. On the other hand, PCD formed with conventional diamond crystals that are electrical insulators, includes a much higher resistance than the PCD of the present invention. This is true both for PCD materials which include metal binder materials therein, and PCD materials void of such metal binder materials.

An exemplary embodiment PCD of the present invention is formed by using semiconductive diamond grit feedstock formed of semiconductive diamond crystals doped with Li, Be or Al or combinations thereof. In another exemplary embodiment of the present invention, PCD may be formed by using a combination of semiconductive and conventional, non-conductive diamond grit feedstock such as Type I diamond grit feedstock. In yet another exemplary embodiment of the present invention, the PCD is formed using conventional undoped diamond grit feedstock (such as Type I diamond grit feedstock) together with a suitable quantity of additives such as B, Li, Be and Al. The additives diffuse throughout the diamond lattice so as to cause the diamond crystals to transform to diamond crystals that include semiconductive surface layers. This diffusion phenomenon takes place during the HTHP sintering process used to solidify the PCD material. The PCD material formed according to each of the aforementioned methods, is semiconductive in nature. Hereinafter, both the PCD material formed using semiconductive diamond grit feedstock and the PCD material formed using conventional diamond grit feedstock and an additive to convert the diamond crystals to having semiconductive surface layers, will be collectively referred to as semiconductive PCD.

The semiconductive PCD of the present invention is a solid structural body commonly referred to as an ultra-hard material or ultra-hard layer and may be used as a cutting layer on cutting tools and cutting elements, or a wear resistant layer for other applications. For convenience, cutting elements and cutting tools are referred to as "cutting elements" hereinafter. The semiconductive PCD may be a layer formed over a substrate to produce a cutting element. In an exemplary embodiment, the cutting element may be inserted into a drill bit and used for earth boring. The semiconductive PCD of the present invention may be used in various other applications and industries, in other exemplary embodiments.

An exemplary cutting element is shown in FIG. 1. FIG. 1 shows cutting element 10 formed of substrate 12 and ultra hard layer 16 which is also referred to as a cutting table and includes top surface 18. Ultra hard layer 16 is formed of semiconductive PCD in the present invention. Interface 14 is formed between substrate 12 and ultra hard layer 16. According to another exemplary embodiment, one or more transition layers (not shown) may be formed between ultra hard layer 16 and substrate 12. The generally cylindrically-shaped cutting element illustrated in FIG. 1 is intended to be exemplary only and according to various other exemplary embodiments, the cutting elements and ultra-hard layers may take on any of various other shapes.

Figure 2:
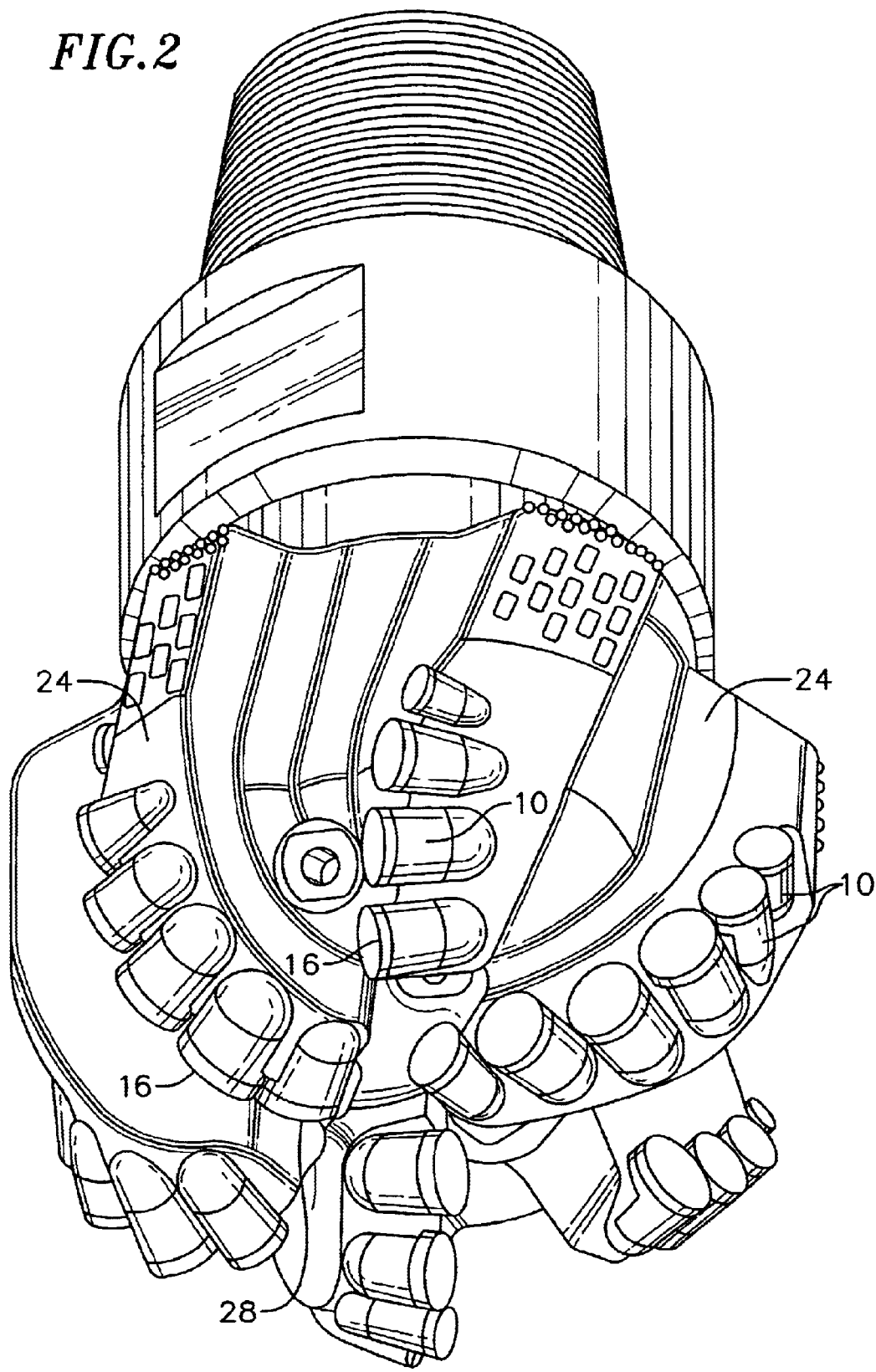
FIG. 2 is a perspective view of a bit body outfitted with exemplary embodiment cutting elements of the present invention shown in FIG. 1.

In an exemplary embodiment, the cutting element is mounted on a bit such as the drag bit shown in FIG. 2, and contacts the earthen formation along edge 28, during drilling. In the exemplary embodiment shown in FIG. 2, the cutting elements 10 are joined to pockets or other receiving shapes that extend into drag bit body 24 by brazing or other means well known in the art. The illustrated arrangement is intended to be exemplary only and cutting elements 10 may be used in various other arrangements in other exemplary embodiments.

The method for forming the semiconductive PCD material includes providing a substrate and providing a layer of diamond powder over the substrate, then using HTHP processing to sinter, thereby solidifying the layer of diamond powder and converting the same to an ultra-hard layer of PCD, and also bonding the PCD layer to the substrate to form a cutting element. The substrate may be a pre-formed solid substrate, or it may be provided in powder form and also solidified during the sintering operation. The substrate may be formed of various matrix materials. In an exemplary embodiment, the substrate may be formed of cemented tungsten carbide. Cemented tungsten carbide generally refers to tungsten carbide particles disbursed in a substrate binder metal matrix such as iron, nickel, or cobalt. Other substrate materials may be used in other exemplary embodiments. Wear resistant materials suitable for use as the substrate may be selected from compounds of carbide and metals selected from Groups IVB, VB, VIB, and VIIB of the Periodic Table of the Elements. Examples of other such carbides include tantalum carbide and titanium carbide. Substrate binder matrix materials suitable for use in embodiments of the invention include the transition metals of Groups VI, VII, and VII of the Periodic Table of the Elements. For example, iron and nickel are good substrate binder matrix materials.

The layer of diamond powder used to form a semiconductive PCD material in an exemplary embodiment of the present invention, includes of a plurality of fine diamond crystals. The layer of diamond powder may be provided directly on the substrate or one or more optional transition layers may be provided between the layer of diamond powder and the substrate.

According to one exemplary embodiment, the layer of diamond powder includes at least some semiconductive diamond grit feedstock consisting of diamond crystals doped with Li, Be, or Al. The semiconductive diamond feedstock may be mixed with conventional, undoped diamond feedstock to form the layer of diamond powder. In another exemplary embodiment, the diamond crystals of the layer of diamond powder may consist substantially only of semiconductive diamond grit feedstock.

According to another exemplary embodiment, the layer of diamond powder may consist of conventional diamond crystals that are insulators such as, for example, Type I diamond crystals. According to this exemplary embodiment, an additive such as Li, Be, B or Al is added to the layer of diamond powder. The additives may be in powder or granular form and are mixed throughout the layer of diamond powder. In an exemplary embodiment, the additives may be mixed in uniformly throughout the diamond powder layer. The additives are chosen to be small enough to diffuse into the diamond lattice formed as the layer of diamond powder solidifies to form the PCD layer. Because of the small size of the diamond lattice in PCD, the lattice can only accommodate a limited number of impurity species (i.e., additives) for transforming the conventional, insulating diamond crystals to semiconductive diamond crystals. Li, Be, B and Al are elements that are known to be small enough to diffuse into the diamond lattice. Such are intended to be exemplary only and other impurity atoms or compounds may be used in other exemplary embodiments. Li, Be, B and Al make the PCD a P-Type semiconductor.

The quantity of additive included in the layer of diamond powder ranges from 0.1 wt % to 10.0 wt % in an exemplary embodiment, but other weight percentages may be used in other exemplary embodiments. The upper limit of additive weight percentage is determined by the amount above which the sintering process is adversely affected. An appropriate quantity of suitably small elements or compounds of additives are chosen so that the additives diffuse into and throughout the diamond lattice and cause the insulating diamond crystals to transform to semiconductive diamond crystals. It has been found that a very small amount of the additives can convert the diamond crystals and achieve an improvement of increased conductivity. During the transformation of the insulating diamond material to a semiconductive material, some or all of the diamond crystals are converted to diamond crystals having a semiconductive surface due to diffusion of the additive. This diffusion phenomenon takes place during the HTHP sintering process used to solidify the PCD, during which the additive species are free to diffuse throughout the PCD. It is not necessary to obtain full conversion of the entire diamond crystal to a semiconductive diamond crystal in order to realize a significant conductivity improvement. Rather, the transformation of the surface layer of the diamond crystals to semiconductive surface layers, improves the conductivity and, hence, cuttability of the formed PCD. According to this embodiment, undoped diamond crystals, such as Type I diamond crystals, are converted to diamond crystals that include semiconductive surface layers.

According to either of the aforementioned exemplary methods of formation, an ultra-hard material of semiconductive PCD is produced. According to either of the exemplary embodiments, sufficient metal binder material may be included in the layer of diamond powder to produce a metal binder material within the PCD material at a volume percentage of up to about 30%, but other volume percentages of binder material may be used in other exemplary embodiments. According to another exemplary embodiment, the metal binder material may diffuse into the PCD layer from the substrate, during the HTHP sintering operation. In an exemplary embodiment, the weight percentage for metal binders may range from 8–12% by weight and it is common for a weight percentage of no greater than 15% to be used. Metals such as cobalt, iron, nickel, manganese, tantalum, chromium and/or mixtures or alloys thereof may be used as a metal binder material. The metal binder material facilitates intercrystalline bonding between the diamond grains of the PCD layer, acts to bond the PCD layer to other layers or the substrate, and increases the conductivity of the PCD layer. An aspect of the present invention, however, is that because of the conductive nature of the diamond skeleton in the semiconductive PCD formed with semiconductive diamond crystals or diamond crystals having a semiconductive surface layer, it is not necessary to have a metal matrix present to ensure cuttability.

According to the various embodiments of the present invention, the PCD material has a conductivity sufficiently high to enable cutting using EDM and EDG, even when the PCD was formed without a metal binder or after the metal matrix material has essentially been completely removed by leaching. In one exemplary embodiment, PCD of the present invention that is substantially free of metal binders, was formed to have a resistance of less than 1000 ohms. In another embodiment, the PCD layer formed with a metal binder therein at a weight percentage no greater than 10%, had a resistance of less than 50 ohms.

The resistance values recited herein, are conventional resistance measurements made using probes spaced about 1 cm apart on the sample surface.

After the solid semiconductive PCD is formed, an Electro-Discharge Machining or Electro-Discharge Grinding cutting operation may be required to cut the PCD to a desired shape. Increased cutting rates can be achieved on such semiconductive PCD materials using EDM and EDG due to the semiconductive nature of the PCD. This is true even though the cooling and dielectric fluids used throughout the EDM and EDG processes, and the electrical arcs produced by the EDM and EDG processes themselves, leach any metal binder material from the semiconductive PCD during the cutting operation. Even if the metal binder is lost due to leaching, or if metal binder materials are not included at all, applicant has discovered that the PCD of the present invention is sufficiently conductive to ensure cuttability in Electro-Discharge Machining and Electro-Discharge Grinding cutting operations. The semiconductive PCD further includes a very high abrasion resistance while still retaining its cuttability. Since the addition of metal binder material can be reduced or even eliminated, the hardness, wear resistance and thermal stability of the formed PCD layer is not compromised and may be improved.

After the solid semiconductive PCD is cut to form a cutting element, the cutting element may be joined to a drill bit body by brazing or other means well known in the art.

Figure 3:
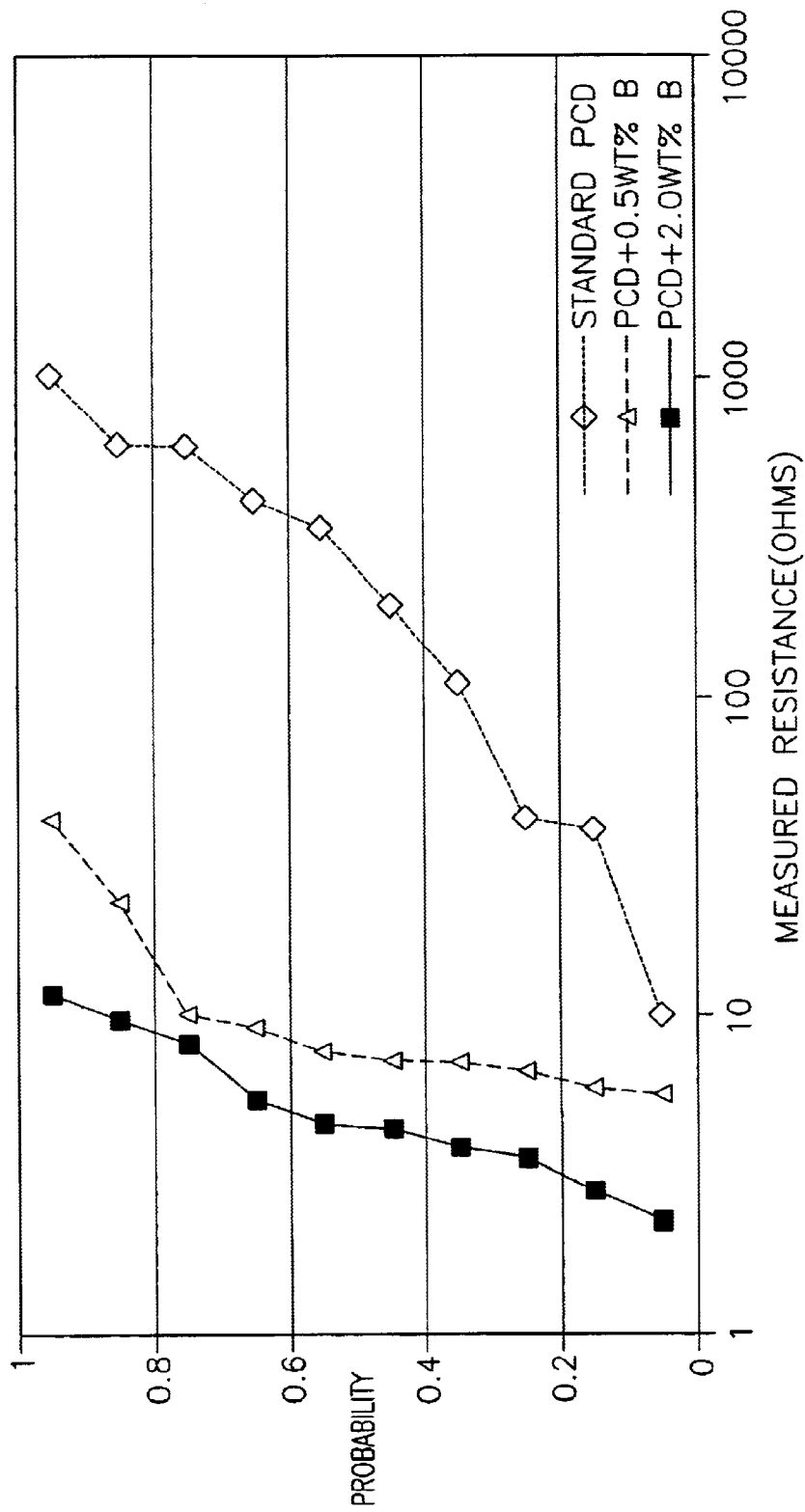
FIG. 3 is a graphical representation showing the effects of diamond crystals having semiconductive surface layers, within PCD material according to an exemplary embodiment of the invention
Figure 4:
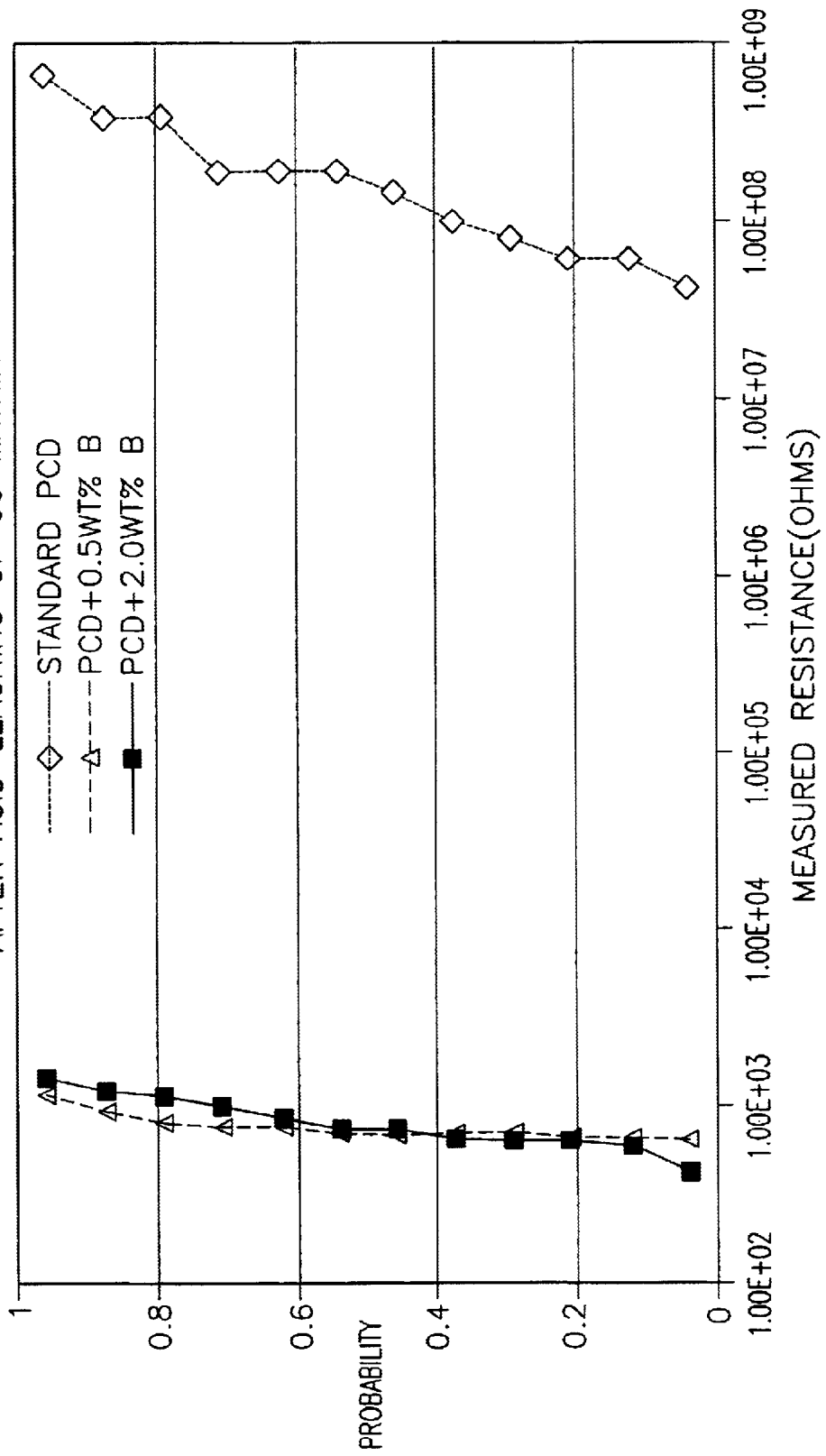
FIG. 4 is another graphical representation showing the effects of diamond crystals having semiconductive surface layers, within PCD material according to an exemplary embodiment of the invention.
Figure 5:
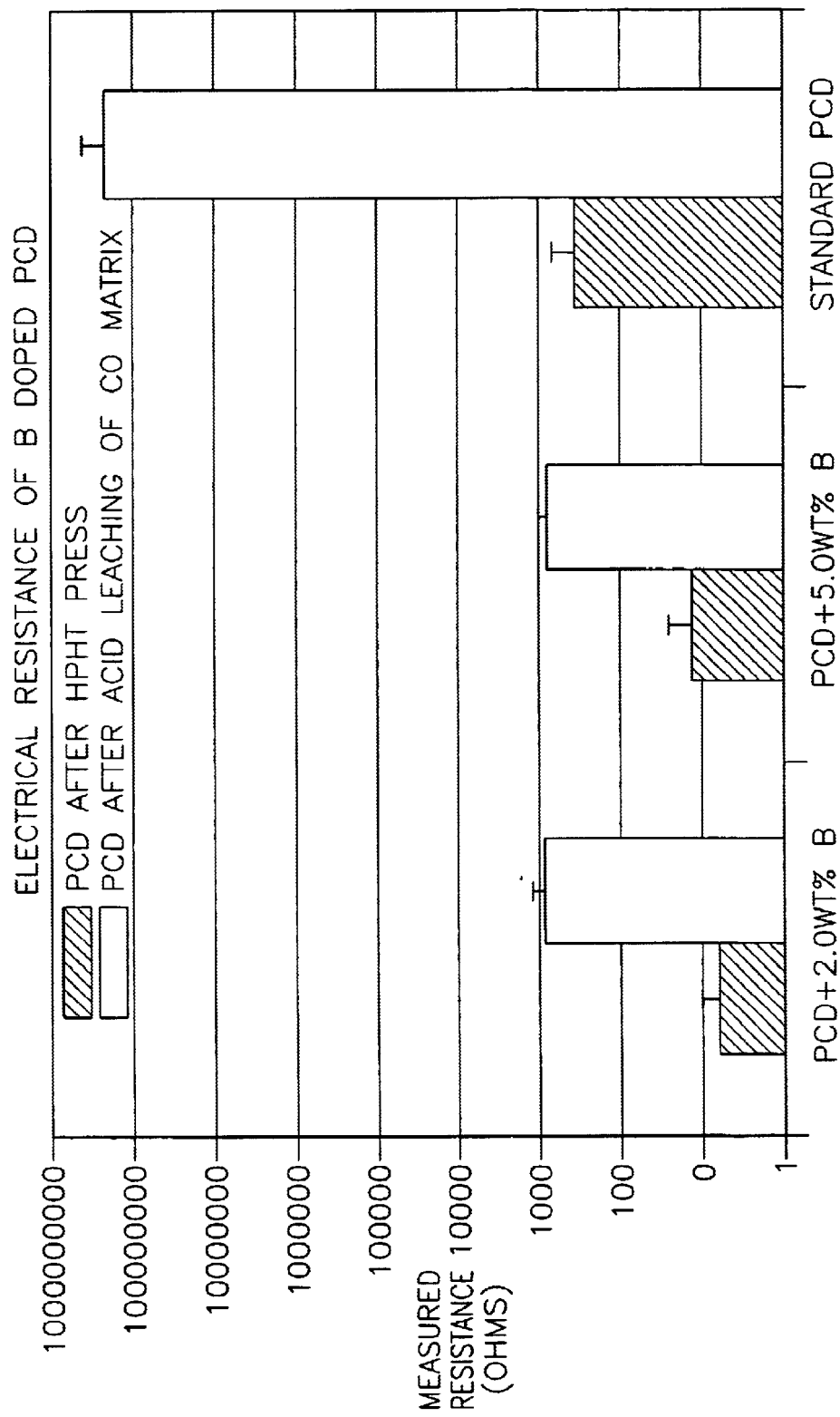
FIG. 5 is a graphical representation showing a comparison between conventional PCD material and exemplary semiconductive PCD materials formed according to an exemplary embodiment of the present invention.

FIGS. 3–5 are graphical representations showing the advantages of exemplary semiconductive PCD formed according to embodiments of the present invention. FIGS. 3–5 collectively show that the semiconductive PCD formed according to the present invention includes a significantly lower resistance, i.e., a significantly higher conductivity, than standard PCD material. The figures also show that, after acid leaching of the metal matrix material during the cutting process, the semiconductive PCD of the present invention also exhibits a significantly reduced resistance (i.e., increased conductivity) with respect to standard PCD formed of conventional, insulative diamonds. FIGS. 3–5 also show that the effect of acid leaching during the cutting process, is suppressed in semiconductive PCD formed according to the present invention, in comparison to standard PCD. "Standard PCD" consists of conventional insulative diamonds, such as Type I diamonds.

FIG. 3 is a Weibull plot commonly used for displaying a non-normal distribution of data samples and shows the measured resistance after HTHP processing of a semiconductive PCD layer, as compared to standard PCD, as above. Conventional resistance measurements were made using probes spaced about 1 cm apart on the sample surface, in all cases. In FIG. 3, Sample 1 is PCD formed by adding 2.0 weight percent of boron to a layer of diamond powder including conventional Type I (insulating) diamond grit feedstock, then sintering to convert at least some of the insulative diamond crystals to include a semiconductive surface layer. FIG. 3 also shows Sample 2 which is PCD formed by adding 0.5 weight percent of boron to a layer of conventional diamond powder including conventional Type I diamond grit feedstock, then sintering to convert at least some of the insulative diamond crystals to include a semiconductive surface layer. Each of Sample 1 and Sample 2 are PCD materials that include a cobalt matrix material at about 10% by weight. The standard PCD sample is a conventional PCD material that is substantially similar to Samples 1 and 2, except that the standard PCD material is formed only with conventional, insulative diamonds. As illustrated in FIG. 3, the two PCD samples of present invention exhibit a reduced resistance.

FIG. 4 is another Weibull plot of measured electrical resistance of the PCD material samples used in FIG. 1, after removal of substantially all of the cobalt matrix phase of such samples by acid leaching. In the examples used to provide the data shown in FIG. 4, acid leaching was intentionally caused for data gathering purposes, by boiling in hydrofluoric acid and nitric acid, but other exemplary techniques may be used alternatively. Similar acid leaching of the cobalt matrix phase from the PCD also occurs as a result of the cooling and dielectric fluids used in conventional EDM and EDG cutting operations which can leach out any metal binder material present in the PCD material. As such, FIG. 4 is representative of PCD material during EDM and EDG cutting operations. FIG. 4 shows a difference of several orders of magnitude in resistance between each of Sample 1 and Sample 2 of the present invention, and standard PCD. Each of the standard PCD and Samples 1 and 2 were substantially free of metal binder materials when the measurements plotted in FIG. 4 were made.

FIG. 5 is a bar graph summarizing the electrical resistance measurements shown in FIGS. 3 and 4. FIG. 5 shows that, after sintering and prior to leaching, each of PCD Samples 1 and 2 have a measured resistance of about 10 ohms, while the standard PCD sample has a measured resistance of about 400–500 ohms. In particular, after HTHP processing, Sample 1 has a measured resistance of about 8 ohms and Sample 2 has a measured resistance of about 20 ohms, i.e. both samples have a resistance less than 50 ohms. As formed, then, it can be seen that each of the semiconductive PCD samples exhibit a resistance of less than 10%, and more specifically less than about 5%, of the corresponding resistance of a substantially similar PCD layer formed only of Type I or other conventional insulative diamonds. After leaching substantially all metal binder material from Samples 1 and 2 of the present invention, Samples 1 and 2 both exhibit a measured resistance of about 1000 ohms, whereas the standard PCD has a resistance of about $2-3 \times 10^8$ ohms. The increase in resistance due to acid leaching is much more significant in the standard PCD as compared to Samples 1 and 2.

It is believed that semiconductive PCD material of the present invention formed using diamond grit feedstock consisting of Li-, Be- or Al-doped diamond crystals and without the addition of metal binder materials, will exhibit an even greater improvement in resistance/conductivity characteristics, than the PCD layers formed to initially include metal binder materials and from which the metal binder materials are subsequently removed by leaching (as illustrated in FIGS. 4 and 5), when compared to PCD material consisting only of conventional diamonds. Applicant believes that the absence of the additive impurity species used to convert conventional PCD to semiconductive PCD, provides superior diamond crystal-to-diamond crystal bonding.

FIGS. 3–5 and Samples 1 and 2 are provided to be illustrative of the advantages of the present invention. Samples 1 and 2 are exemplary only and the reduced resistance advantage of the semiconductive PCD materials of the present invention is similarly achievable for samples formed having different metal binder materials and samples having binder materials present in different percentages.

The semiconductive PCD material of the present invention (i.e., a PCD layer with at least some Al-doped, Be-doped or Li-doped diamond crystals, or at least some diamond crystals having semiconductive surfaces), also has a much greater thermal conductivity than conventional PCD. Applicants believe that the thermal conductivity of the semiconductive PCD material of the present invention may be 15 times greater than the conductivity of conventional PCD material at 80°K. and 4–5 times greater than the conductivity of conventional PCD material at room temperature. When used as a cutting layer in a cutting tool, a semiconductive PCD material is better able to conduct the heat generated by the abrasion of the PCD cutting layer against the object being cut, and thus maintain a lower temperature on the cutting layer. Increased temperatures on the cutting layer and the tool are known to decrease the life of the cutting tool. Consequently, the use of the semiconductive PCD of the present invention as a cutting layer, will provide an increased operating life of the cutting element.

The preceding merely illustrates the principles of the invention. It will thus be appreciated that those skilled in the art will be able to devise various arrangements which, although not explicitly described or shown herein, embody the principles of the invention and are included within the scope and spirit. Furthermore, all examples and conditional language recited herein are principally intended expressly to be only for pedagogical purposes and to aid in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and the functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims.

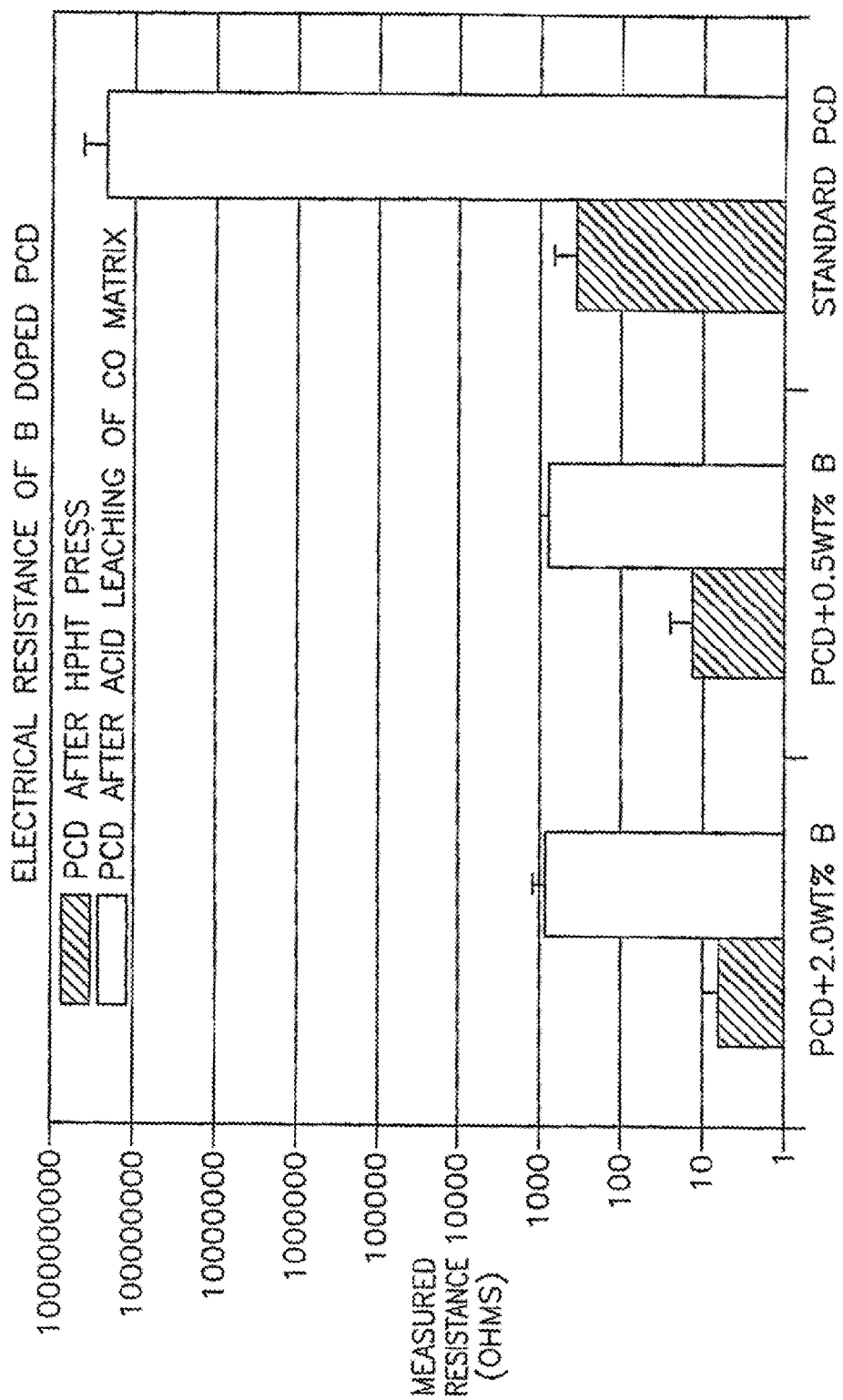

What is claimed is:

1. A method for forming a cutting element comprising:
   providing a layer of diamond powder comprising non-conductive diamond crystals and a doping additive; and
   heating to convert said non-conductive diamond crystals and said additive to a polycrystalline diamond layer, said polycrystalline diamond layer being a solid semiconductor material.

2. The method as in claim 1, wherein said heating to convert comprises sintering.

3. The method as in claim 2, wherein said sintering includes forming semiconductive surface layers on a plurality of said non-conductive diamond crystals.

4. The method as in claim 2, wherein said sintering causes said additive to diffuse throughout said polycrystalline diamond layer and causes said polycrystalline diamond layer to be formed to have a resistance of no greater than 50 ohms.

5. The method as in claim 2, wherein said providing a layer of diamond powder includes providing a powder of metal binder material therein in an appropriate amount such that said sintering produces said polycrystalline diamond layer having said metal binder material therein at a weight percentage no greater than 10% and including a resistance of no greater than 50 ohms.

6. The method as in claim 1, wherein said additive comprises boron.

7. The method as in claim 1, wherein said additive comprises at least one of Li, Be, and Al.

8. The method as in claim 1, wherein said non-conductive diamond crystals substantially comprise Type I diamond grit feedstock.

9. The method as in claim 1, further comprising cutting said polycrystalline diamond layer using one of electro-discharge machining and electro-discharge grinding.

10. The method as in claim 1, further comprising leaching any metal materials present in said polycrystalline diamond layer, wherein after leaching, said polycrystalline diamond layer having a resistance no greater than 1000 ohms.

11. The method as in claim 1, in which said polycrystalline diamond layer is substantially free of metal binder material and has a resistance of no greater than 1000 ohms.

12. A method for forming a cutting element comprising:
    providing a layer of diamond grit feedstock including diamond crystals doped with at least one of Be, Li and Al; and
    sintering to convert said layer of diamond grit feedstock to a polycrystalline diamond layer, said polycrystalline diamond layer being a solid semiconductor material.

13. The method as in claim 12, further comprising providing a substrate and wherein said sintering further comprises bonding said polycrystalline diamond layer to said substrate.

14. The method as in claim 12, wherein said providing a layer of diamond grit feedstock includes providing a powder of metal matrix material therein.

15. The method as in claim 12, wherein said providing a layer of diamond grit feedstock includes providing a powder of metal binder material therein in an appropriate amount such that said sintering produces said polycrystalline diamond layer having said metal binder material therein at a weight percentage no greater than 10%, wherein the polycrystalline diamond layer includes a resistance of no greater than 50 ohms.

16. The method as in claim 12, further comprising leaching any metal materials present in said polycrystalline diamond layer, said leached polycrystalline diamond layer having a resistance no greater than 1000 ohms.

17. The method as in claim 12, further comprising cutting said polycrystalline diamond layer using one of electro-discharge machining and electro-discharge grinding.

18. The method as in claim 12, wherein said providing comprises providing a layer of diamond grit feedstock that consists substantially only of said diamond crystals doped with at least one of Be, Li and Al.

* * * * *

UNITED STATES PATENT AND TRADEMARK OFFICE
CERTIFICATE OF CORRECTION

PATENT NO. : 6,846,341 B2
APPLICATION NO. : 10/374373
DATED : January 25, 2005
INVENTOR(S) : Middlemiss It is certified that error appears in the above-identified patent and that said Letters Patent is hereby corrected as shown below:

On the Title Page

(56) References Cited            Delete "Wentdorf",
U.S. Patent Documents            Insert --Wentorf--
3,141,855 A 7/1964...

In the Drawings

FIG. 5, Sheet 5 of 5             Delete Drawing Sheet 5 and substitute therefore the
                                 Drawing Sheet, consisting of Fig. 5, as shown on the
                                 attached page

In the Specification

Column 5, line 10                Delete "disbursed",
                                 Insert --dispersed--

Signed and Sealed this

Sixteenth Day of October, 2007

JON W. DUDAS
*Director of the United States Patent and Trademark Office*